UNITED STATES PATENT OFFICE.

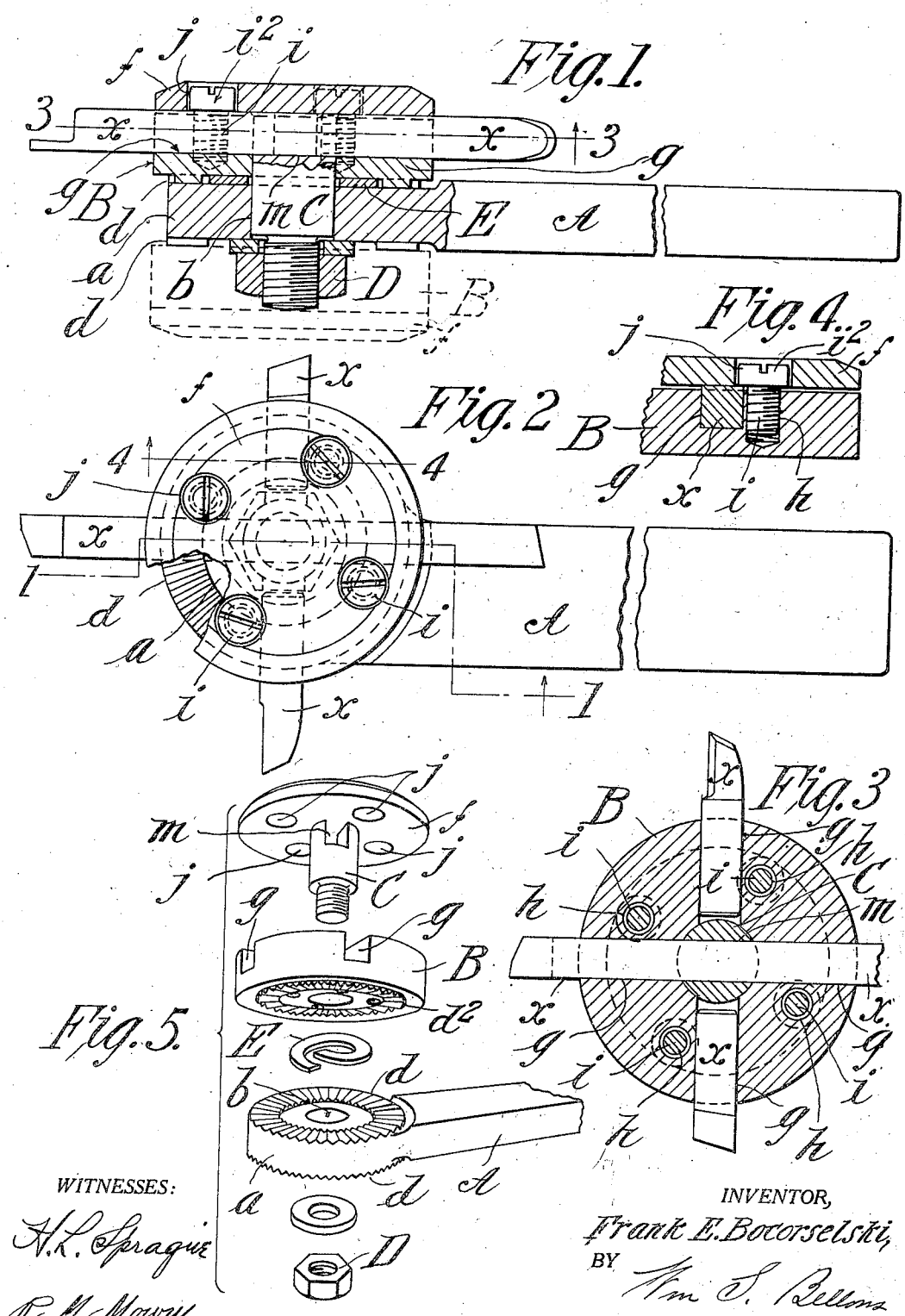

FRANK E. BOCORSELSKI, OF SPRINGFIELD, MASSACHUSETTS.

TURRET TOOL-HOLDER.

No. 897,576.	Specification of Letters Patent.	Patented Sept. 1, 1908.

Application filed June 20, 1908. Serial No. 439,568.

*To all whom it may concern:*

Be it known that I, FRANK E. BOCOR-SELSKI, a citizen of the United States of America, and resident of Springfield, in the county of Hampden and State of Massachusetts, have invented certain new and useful Improvements in Turret Tool-Holders, of which the following is a full, clear, and exact description.

This invention relates to an improved holder for a plurality of tools in which is comprised a tool-carrying head, a turret, a bar or holder,—adapted to be inserted, and rigidly confined, in the manner of a single lathe tool, in the tool-part of a lathe or like machine,—on which bar the turret head is rotatable, with certain special provisions and constructions for the reception and confinement of the individual tools, for the confinement of the turret head on the holder bar, for a quick and rapid substitution of one tool for another, or for the presentation at the working point of any one of the several tools, and for enabling one to use the attachment either as a "right" or "left" hand multiple tool in the lathe.

The device comprises further constructions and arrangements for the attainment of other advantages which will be hereinafter rendered manifest.

The improved tool holder is illustrated in the accompanying drawing, and the novel combinations and constructions of parts are described in conjunction therewith and defined in the claims.

In the drawings:—Figure 1 is a partial edge view and partial central longitudinal section through the turret tool holder. Fig. 2 is a plan or view at right angles to Fig. 1.
The section line 1—1, on Fig. 2 indicates the plane on which the sectional portion of Fig. 1 is drawn. Fig. 3 is a sectional view through the turret head on a plane at right angles to its axis and as indicated by line 3—3, Fig. 1.
Fig. 4 is a partial sectional view as taken on line 4—4, Fig. 2, for particularly illustrating structural features and arrangements hereinafter referred to. Fig. 5 is a view of the component parts of the device in separated relations.

Similar characters of reference indicate corresponding parts in all of the views.

In the drawings,—A represents the holder bar which for the greater portion of its length is of straight and cross-sectionally rectangular form similar to that of an ordinary simple and single lathe tool, whereby like the latter it may be inserted and rigidly confined in the tool post of a lathe. The forward end portion $a$ of the holder bar is widened and of approximately circular form, it has a circular round hole $b$ therethrough and it has an area concentrically around on its surfaces at its opposite side and outside of the orifices of the aperture $b$ a multiplicity of radial serrations $d$.

B represents an annular member facewise supported on the rounded end portion $b$ of the holder bar, being centered thereon by the stud C and confined by the engagement of the enlarged flange like head $f$ of the stud which by the exercise of the locking nut D operates to bind the annular member or turret head firmly and immovably to the holder. The inner circular face of the annular member B has radial serrations $d^2$ for engagement in those $d$ of the holder. The said annular member is provided within its one face portion which is opposite or most remote from its face which is in engagement with the holder with a plurality of tool receiving grooves $g$ which extend radially and in different directions from the central aperture to the periphery; and in the present instance four of these grooves are provided, one pair thereof being in alinement and at right angles to the alined grooves of the other pair. These grooves have a depth as represented in Figs. 1 and 4 slightly less than the thickness or cross sectional dimension of the similarly sized shanks of the various machine tools $x$, the working ends of which project in different directions radially and outwardly beyond the annular member B. The said member B has screw holes $h$ adjacent each of the tool receiving grooves, parallel with the axis of the member B and so that when the threaded shanks of the screws $i$ are screw engaged in the holes $h$ their heads $i^2$ overlie the margins of the grooves and have individual confinement on the tools which protrude slightly beyond the face of the grooved member, as most particularly shown in Fig. 4.

The head or flange-like enlargement $f$ of the stud C which overlies the outer face of the annular member B has four holes $j$ through it parallel with its axis, that is a number corresponding to that of the tools $x$ and their individual confining screws $i$, so that when the parts are assembled and temporarily immovably confined the heads of the confining screws are accommodated and ensconced within said holes. Because of the provision of the holes $j$ the flange-like head of the stud may bear directly against the shanks of the tool $x$ and acquire its abutment or resistance for the binding effect through the instrumentality of the nut D; and, moreover, the screws $i$ may be separately or individually loosened for the removal or replacement of any one of the lathe tools $x$.

E represents a split spring washer surrounding an intermediate portion of the stud C and having its location and interposition between the adjacent faces of the end portion of the holder bar A and the annular member B, and concentrically within the circular areas of the serrations $d$ and $d^2$. This spring washer is effective when the nut D is loosened, preparatory to partially rotating the turret head, to axially move both such head and the stud and its flange enlargement to carry the interengaging serrated parts $d$ and $d^2$ free from each other to permit most readily any required extent of rotative movement of the member B, after which by the tightening of the nut all parts of the tool are held the one absolutely immovable relatively to the other.

The stud C at the junction of its shank with its flange enlargement or head $f$ is constructed with a transverse aperture $m$ which may register with an opposite pair of the tool receiving grooves $g$ whereby a doubly long, and double ended tool may be accommodated in and extend outwardly beyond an opposite pair of the receiving grooves $g$,—it being apparent that the middle of the tool shank has its disposition through said aperture in the stud.

This turret tool holder may be employed either at a "right" or a "left" as will be apparent from the dotted line indication in Fig. 1.

I claim:—

1. In a turret tool holder, in combination, a holder-bar having a transverse aperture through its end portion, an annular member provided within its one face portion with a plurality of differently radially extending tool receiving grooves opening to the outer edge of such member, and having screw holes parallel with its axis adjacent said grooves, headed screws the threaded shanks of which engage in said holes while edge portions of their heads overlie the grooves for individual confinements of the tools in the grooves, a stud having at one end an enlarged head provided with a plurality of apertures at points outside of the stud in which the heads of said screws are respectively accommodated, and said stud having a threaded portion at its other end, and extended centrally through the said annular member and through the holder-bar aperture, and a binding nut screw-engaged on the threaded end portion of the stud and seating against the end portion of the holder bar.

2. In a reversible turret tool holder, in combination, a holder-bar having a transverse hole through its end portion and having its opposite face surrounding the ends of said hole radially serrated, an annular member provided within its one face portion with a plurality of differently radially extending tool receiving grooves all opening to the outer edge of such member, and having its side opposite its grooves serrated, a stud, having an enlarged head at one end and a threaded portion at its other end, extended centrally through the said annular member and through the holder-bar aperture, and a binding nut screw engaged on the threaded end portion of the stud.

Signed by me at Springfield, Mass., in presence of two subscribing witnesses.

FRANK E. BOCORSELSKI

Witnesses:
Wm. S. Bellows,
G. R. Driscoll.